United States Patent [19]

Everett

[11] 4,452,410

[45] Jun. 5, 1984

[54] IN-LINE GYRO TYPE AIRCRAFT

[76] Inventor: Robert A. Everett, 704 S. 142 E. Ave., Tulsa, Okla. 74108

[21] Appl. No.: 332,319

[22] Filed: Dec. 18, 1981

Related U.S. Application Data

[63] Continuation-in-part of Ser. No. 177,094, Aug. 11, 1980, abandoned, and Ser. No. 971,783, Dec. 21, 1978, abandoned.

[51] Int. Cl.$^3$ ..................... B64C 27/00; B64C 39/06
[52] U.S. Cl. ............................... 244/12.2; 244/23 C; 416/23
[58] Field of Search ............... 244/6, 8, 12.1, 12.2, 244/12.3, 23 R, 23 B, 23 C, 39, 217; 46/74 D, 75; 416/23, 24, 144

[56] References Cited

U.S. PATENT DOCUMENTS

| | | | |
|---|---|---|---|
| 1,715,427 | 6/1929 | Pitcairn | 416/144 |
| 2,372,481 | 3/1945 | Gagas | 416/24 |
| 2,716,460 | 8/1955 | Young | 416/24 |
| 2,743,885 | 5/1956 | Peterson | 244/12.2 |
| 3,514,053 | 5/1970 | McGuinness | 244/23 C |
| 3,572,613 | 3/1971 | Porter | 244/12.2 |
| 3,599,902 | 8/1971 | Thomley | 244/12.2 |
| 3,900,176 | 8/1975 | Everett | 244/6 |

FOREIGN PATENT DOCUMENTS

| | | | |
|---|---|---|---|
| 847689 | 10/1939 | France | 244/217 |
| 586605 | 12/1958 | Italy | 244/12.2 |
| 432124 | 7/1935 | United Kingdom | 416/23 |
| 700293 | 11/1953 | United Kingdom | 244/23 C |

Primary Examiner—Charles E. Frankfort
Attorney, Agent, or Firm—Robert A. Everett

[57] ABSTRACT

An aircraft containing aerodynamic and gyroscopic stability that has a high angle of take-off and landing capabilities, with high speed horizontal powered flight, but is also able to sustain power-off flight with autorotation of its multiple extending airfoils. The fuselage has the shape of an inverted saucer with aerodynamic configuration and has an open circular track at its periphery; and riding in this track is a rotary frame and extended airfoil assembly that isin-line with the fuselage. Each extending airfoil contains solid weighted bodies at their tips and this rotary frame and extended airfoil assembly is rotated on the track by an internal power unit. The extending airfoils taper toward their tips and these tips have a knife sharp edge for penetrating the air resistance. Special flaps on the airfoils function for creating additional lift in the downwind quadrant, but in the power-off flight mode, when the rotary frame and extending airfoil assembly is disengaged; the dual purpose flap and trap flap combine to function to trap the slip-stream causing the rotary frame and extended airfoil assembly to rotate. Mounted to the surface of the fuselage are forward thrust engines with rearward extending booms on which are located the tail assembly with flight control surfaces.

6 Claims, 11 Drawing Figures

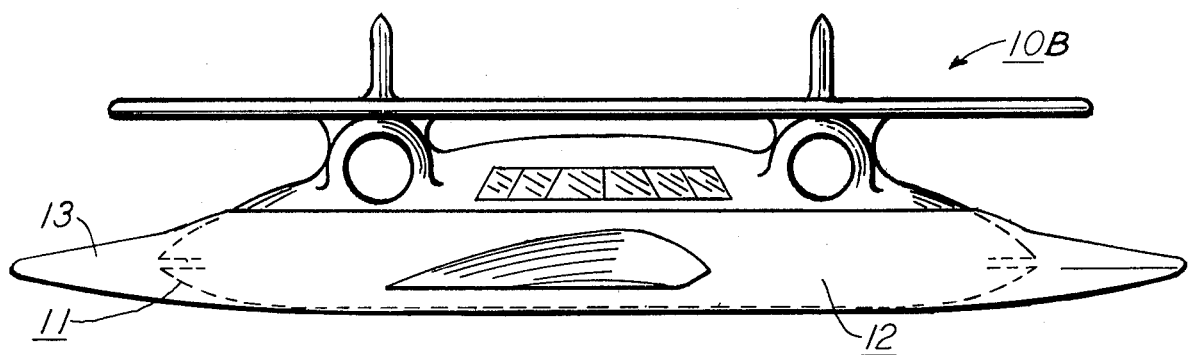
FIG. 11
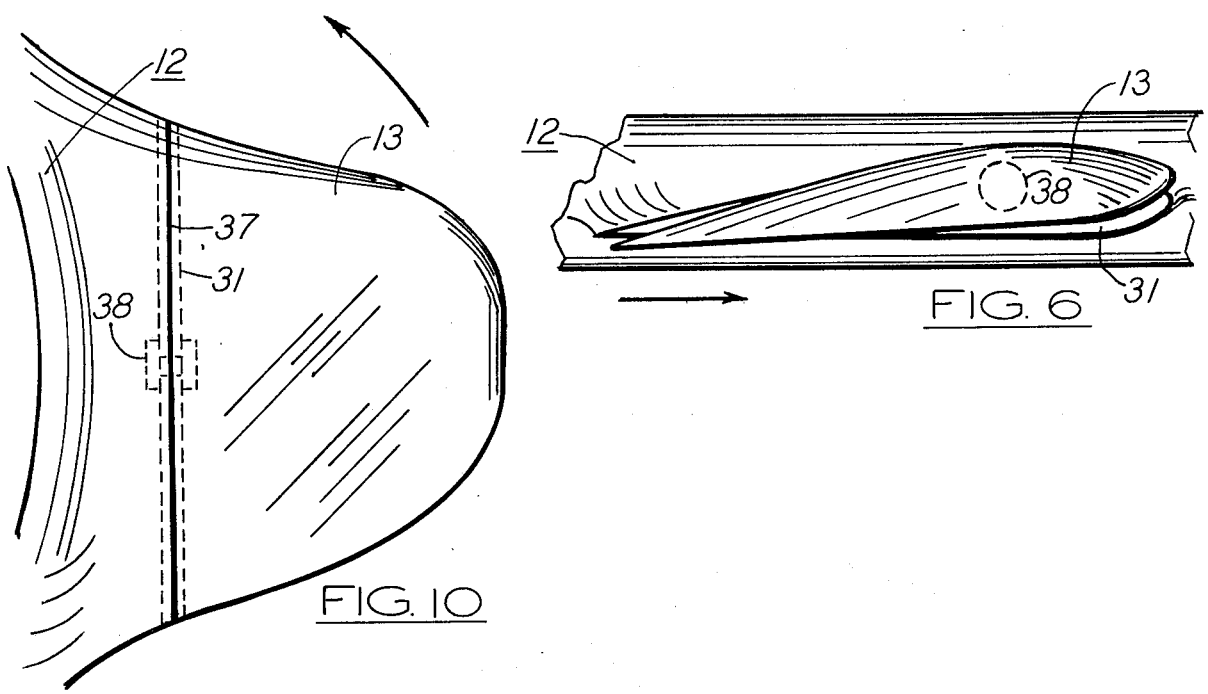
FIG. 10
FIG. 6
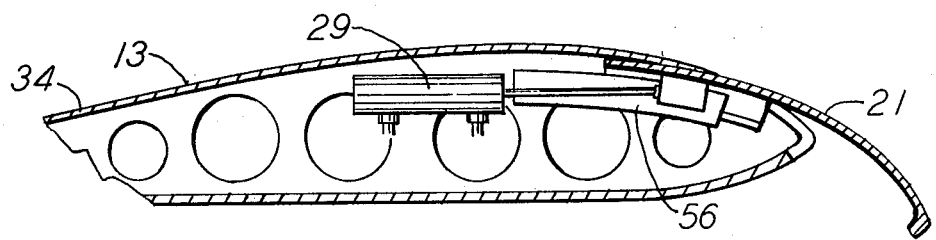
FIG. 5

IN-LINE GYRO TYPE AIRCRAFT

BACKGROUND OF THE INVENTION

1. Field of the Invention

This invention relates generally to rotor wing aircraft that generate vertcal lift along with horizontal flight with gyroscopic stability and back up flight feature of flying horizontally in a power-off mode. This unique type flight without mechanical power source, is due to the aircraft's saucer design configuration. Thus the fuselage also becomes a formidable lift body that is encompassed by a rotating frame and multiple extending airfoils that also form and function as a segmented gyroscope assembly, which permits mass storage of energy. This storage of energy combined with other means that allow this gyro type aircraft to fly horizontally from a high altitude with no fuel consumption and no converting structures for vertical or horizontal flight.

2. Description of prior art

Todays fixed wing aircraft are limited to the amount of lift forces that they can create, do to their design features, power and lift means. So they use a tremendous amount of power and fuel with long run-ways just for take-off and in horizontal flight. Other so called convertiplanes have been invented to overcome this waste of fuel and long take-off area, by using vertical lift for take-off and then using converting means for forward flight. There have been many of these aircrafts and too many to mention here. The well known helicopter has been the most successful and has no converting structures, yet it contains limitations as to forward speed and lift forces.

It is desirable to mention at this time a rotor invention that is capable of modifying a fixed wing aircraft to give it high lift capabilities and which is my own U.S. Pat. No. 3,900,176. It is also necessary to mention three of my aerial toy inventions that are similar to this present invention; U.S. Pat. Nos. 3,613,295; 3,852,910 and 4,157,632. These toy inventions have been tested in flight, which is the basis for this present invention. These inverted saucer shaped aerodynamic aerial toys do fly, even though with some imbalance as part of their flight characteristics, but they fly without the benefit of the use of spoilers, flaps etc. to correct the inherent imbalance feature. Many flight tests have revealed that its combination flywheel and gyroscopic forces are due to its weight distribution that stores up energy and produces angular momentum to a degree; depending on body mass, how fast it turns and how the mass is distributed. This results in extra long flights when hand launched at ground level; therefore a gyro type of aircraft design configuration will also contain these same inherent forces that are condusive in sustaining horizontal flight.

SUMMARY OF THE INVENTION

The primary object of this present invention is to provide an aerodynamic and gyroscopic stable saucer shaped aircraft that has a high angle of take-off and landing capabilities as well as stable high speed horizontal powered flight and also containing structures to allow horizontal flight with out a mechanical power source and no fuel consumption, from a high altitude.

Another object is that the aerodynamic saucer shaped fuselage provides a mounting for the forward thrust engines, tail assembly and landing gear. The fuselage also contains a rigid horizontally mounted rotary frame with multiple horizontal extending airfoils that encompasses the fuselage at its periphery and functions in creating lift forces when spinning.

A further object is that this gyro type of aircraft by its very design configuration, presents a large aerodynamic surface area that includes not only the multiple airfoils, but the fuselage itself that combines to enhance the aircraft's ability to develope a long glide ratio.

A still further object of this invention is that it contains solid weighted bodies at the extreme tips of the airfoils and in contour shape of the airfoils, for creating a positive gyroscopic force and stored energy in a horizontal plane, with a low center of gravity.

Another object is that the multiple extending airfoils' top surface tapers towards its outer tip edge to form a thin edge, for the purpose of penetrating the wall of air in front of the forward moving aircraft and presenting a streamline type of nose area as the extending airfoils pass in the forward quadrant of the fuselage.

A further object is that each extended airfoil contains special flaps for equalizing lift forces on each side of the forward moving gyro type aircraft, they also function in trapping air pressure in the downward quadrant and using this resistance for spinning the rotary frame and extending airfoil assembly in horizontal power-off flight.

A still further object is that this gyro type aircraft's size can include large cargo or passenger capacity, due to its simplicity in design, strength, flight stability and buoyancy, coupled with its ease in converting its mechanical power source into an abundants of lift forces; which makes it ideal for the do-it-yourself plane builders, because it is also highly suitable to mass production of the smaller aircraft even more.

Another object of this invention is that it is not totally dependent upon the special flaps for the equalizing of the lift forces of this gyro type aircraft, but the rotary frame and extended airfoil assembly contains the well known Kruger Flap located in the leading edge of the extended airfoils and made to function automatically in only the downwind quadrant, if necessary for more lift force. It is also obvious by means known to the art, that the extended airfoils can by means, pitch only in the downward quadrant for also equalizing lift forces on this forward moving gyro type aircraft.

Another further object of this invention is to provide a means to correct for any torque created by the friction from the spinning rotary frame and extended airfoil assembly around the stationary fuselage, at the contact bearing points located in replete numbers along the periphery of the fuselage surface and track.

BRIEF DESCRIPTION OF THE DRAWINGS

Many objects and advantages of the present invention will become readily apparent to those skilled in the art as a detailed description of the various embodiments of the present invention unfolds, when taken in conjunction with the appended drawings wherein like reference numerals denote like parts and in which:

FIG. 5 is a vertical sectional end view showing a Kruger Flap in a simplified form, taken along a sectional line 5—5 of FIG. 3;

FIG. 6 is a vertical end view of an alternate structure showing an extended airfoil pitched to create lift, in the down wind quadrant;

FIG. 10 is a top plan view alternate structure shown in FIG. 6;

FIG. 11 is a frontal elevation view of an alternate in-line gyro type aircraft with the fuselage bottom housed inside the rotary frame and multiple extended airfoil assembly, in which this assembly becomes the segmented gyroscope.

DESCRIPTION OF THE PREFERRED EMBODIMENT

Figure 1:
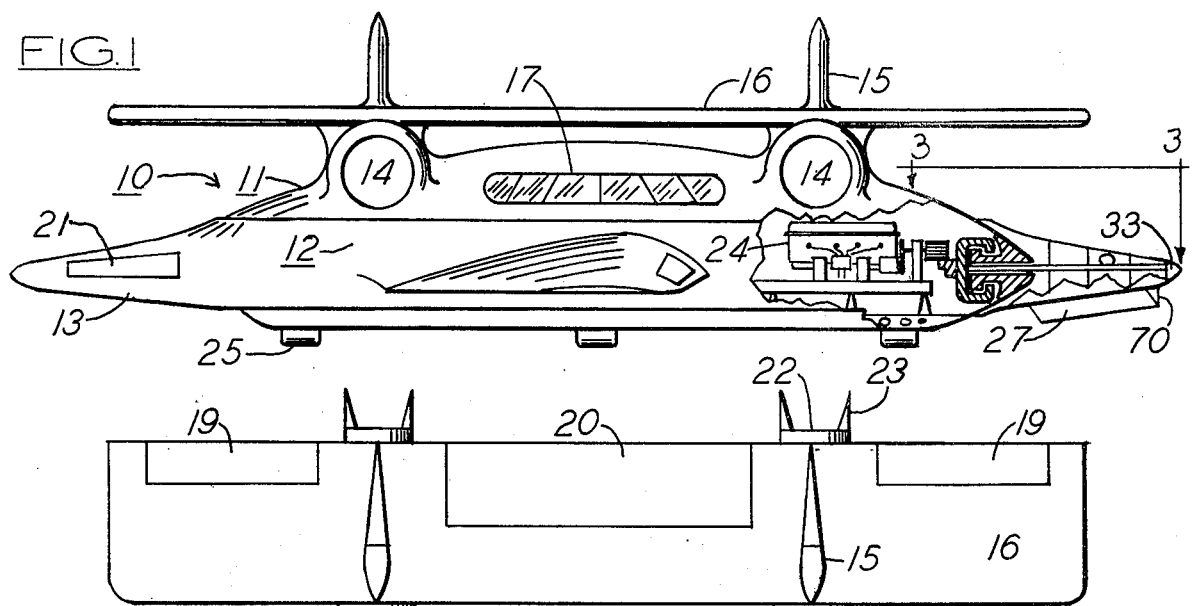
FIG. 1 is a frontal elevation view of an in-line gyro type aircraft.
Figure 2:
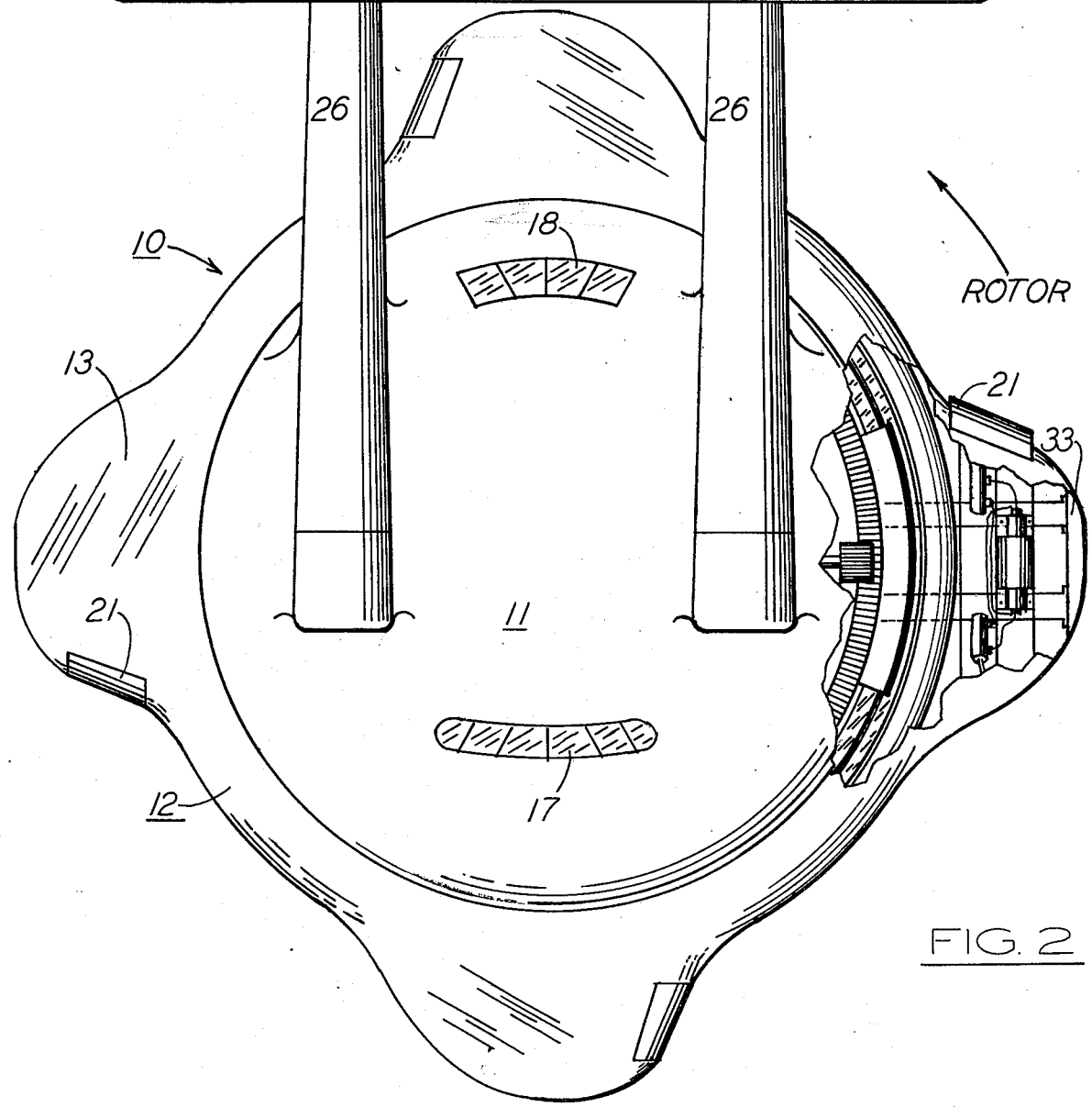
FIG. 2 is a top plan view of an in-line gyro type aircraft.

Referring to FIG. 1, there is shown a frontal elevation view and FIG. 2 which shows a top plan view of an In-Line Gyro Type Aircraft 10, with a pilot compartment 17 and a passenger space 18 all located within the aerodynamic fuselage 11. Attached to the fuselage 11 are twin forward thrust engines 14 mounted within rear extending twin booms 26 with a tail assembly that contains a horizontal stabilizer 16, ailerons 19, twin vertical fins and rudders 15 and tail flap 20 with all control members mounted in the tail area of the twin booms 26. These control members located in the tail area function to control the aircraft 10 in flight, similar to that of the normal fixed wing aircraft. Also located at the tail area are the thrust engines exhaust ports 22, and mounted to them are deflecting vanes 23. These deflecting vanes 23 or similar means, function to correct the torque that is created by the friction between the multiple bearing members that are located in the periphery of the stationary fuselage 10 and the rotary frame 12 and the extended airfoils 13 assembly as it spins in one direction.

Most single rotor type aircraft must contain some type of component to equalize the lift on the rotor blades when the blades spin into the downwind quadrant of rotation of its 360 degrees of rotation (i.e. where the rotor blade's leading edge is facing in the opposite direction of the aircraft's forward flight). This present invention is no exception, since the extended airfoils 13 also face in the opposite direction when in the downwind quadrant of the forward moving aircraft 10 and airfoils 13 having no angle of incidence thus has less lift imbalance.

Figure 3:
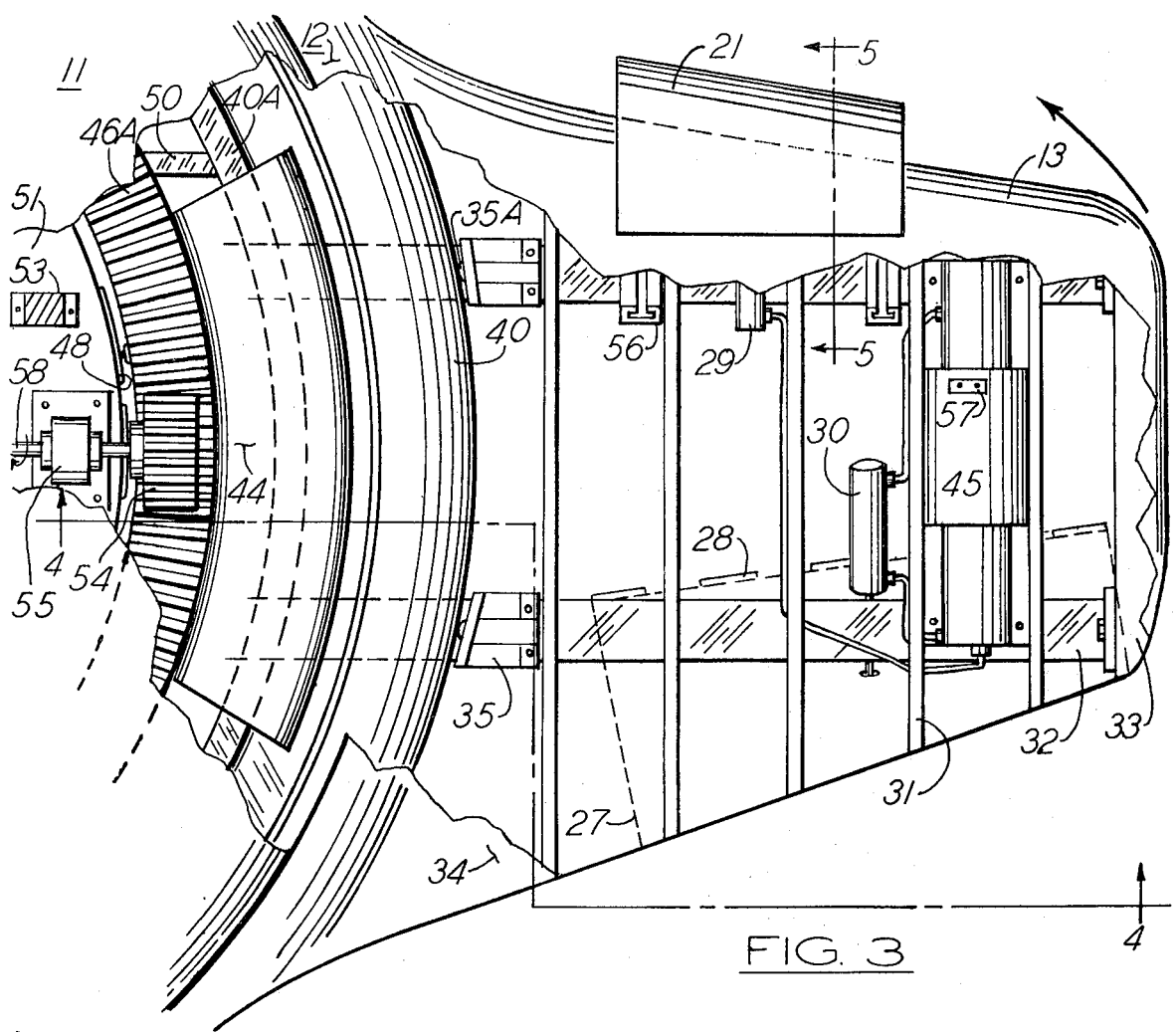
FIG. 3 is a top plan view of a partial fuselage and rotary frame and one extended airfoil in the downwind quadrant with the top surface skin cut away exposing internal construction and components.
Figure 4:
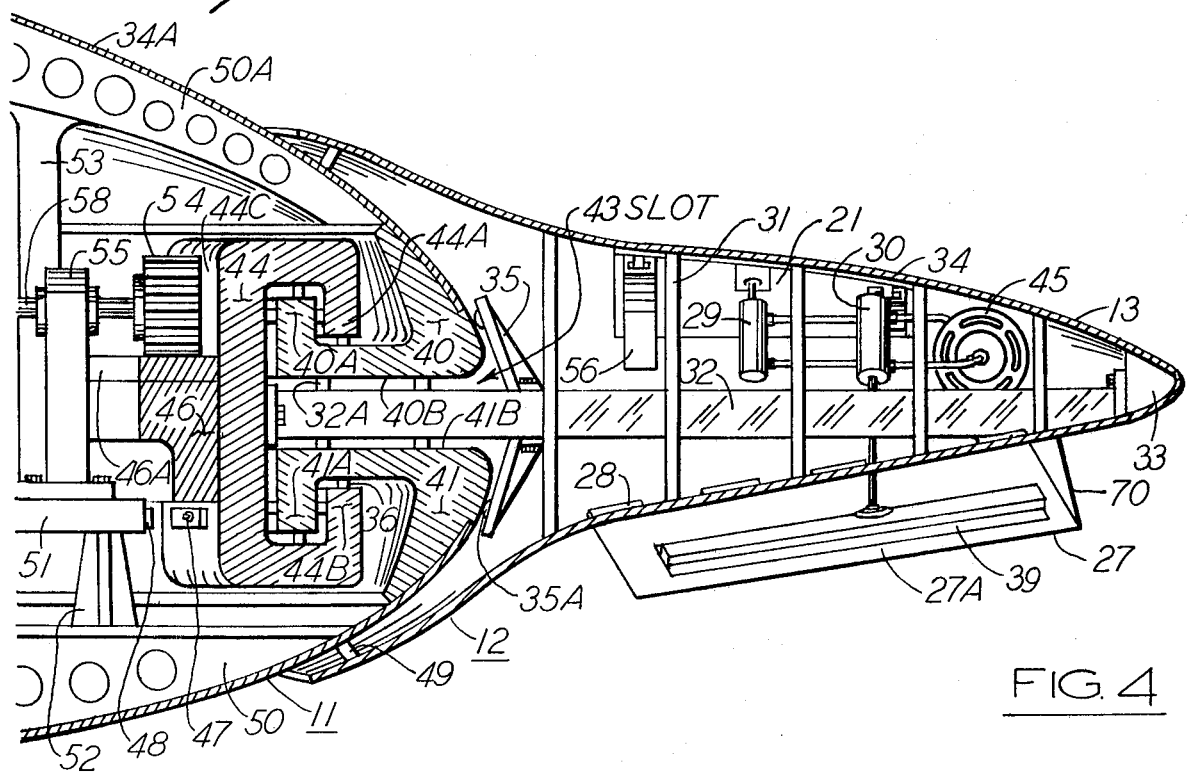
FIG. 4 is a cross-sectional view taken along line 4—4 of FIG. 3 showing the vertical view of the partial fuselage, rotary frame and extended airfoil.

In the present invention, by its very configuration it is able to contain one or several types of compensating lift devices in a combination use of them in order to produce the desired results to equalize the lift forces on each side of the fuselage of the forward moving aircraft 10. In FIGS. 3 and 4 are partial views of the construction of the fuselage 11, and the rotary frame 12 with its extended airfoils 13. Mounted to each multiple extended airfoil's 13 bottom surface is a dual purpose flap 27 shown in an open or extended position and is attached by a hinge 28 means along its front edge and the hydraulic cylinder and linkage 30 actuating unit. This dual purpose flap 27 drops down to function in the slip-stream automatically and in the downwind quadrant only, of the forward moving aircraft 10 as the rotary frame 12 and extended airfoil 13 assembly spins. As the extended airfoils 13 spin into the downwind quadrant of the forward moving aircraft 10, this also spins the inside mounting ("C" shaped bracket 44) of each extended airfoil 13 which has electrical contact 47 and makes contact with a stationary electrical switch 48 located inside of the stationary fuselage 11. These electrical contacts 47 and 48 energize the hydraulic motor unit 45 at the wired contact point 57 causing the hydraulic cylinder and linkage 30 to extend the dual purpose flap 27, and as the spinning extended airfoils 13 moves out of the downwind quadrant, the electrical contacts 47 and 48 are broken and then recontacted, causing the hydraulic motor unit 45 to reverse and retract the dual purpose flap 27. This action of each dual purpose flap 27 of each extended airfoil 13 is actuated in each complete 360 degree cycle, and automatically dropping the dual purpose flap 27 into the slip-stream only in the downwind quadrant. This function causes a creation of lift in the downwind quadrant to equal the lift being created by the forward moving extended airfoils 13 in the upwind quadrant on the opposite side of the fuselage 11, thereby creating equal lift on both sides of the forward moving aircraft 10. This aforesaid operation is performed exactly in the same manner in the case of power failure, except the power source to actuate the hydraulic motor unit 45 can be furnished by auxiliary batteries and means (not shown) may be disengaged to eliminate the friction from the power off internal engine 24 in FIG. 1.

An alternate flap that can be used in place of or in combination with the dual purpose flap, is the Kruger Flap 21 shown in a top plan view in FIG. 3 and in a side view in FIG. 5. FIG. 3 and FIG. 5 shows this said flap 21 connected to and extending from the leading edge of an extended airfoil 13 while in the downwind quadrant. This said flap 21 which is attached by a slide T-slot bracket 56 and hydraulic cylinder and linkage 29 and functions in extending only in the downwind quadrant and thus creating equalizing forces of the forward moving aircraft 10. So these two said flaps 21 and 27 can mount within the same extended airfoils 13 and can operate simultaneously if desirable. Both aforesaid flaps 21 and 27 have their separate hydraulic cylinder and linkage 29 and 30, but can use the same hydraulic motor unit 45 electrical contacts 47 and 48 to function in extending and retracting these two aforesaid flaps 21 and 27 shown in FIGS. 3 and 4 in their downwind extended position. Referring to FIG. 2 which shows a top plan view of the Kruger Flaps 21 in the four different quadrants. But only in the downwind quadrant does the Kruger Flap 21 actually function and that is when it extends itself from the airfoil's leading edge to create lift. In the other three quadrants, the Kruger Flap 21 remains stored in the leading edge of the extended airfoils 13.

Shown in FIGS. 6 and 10 which shows still another type lift equalizing wing pitch-pivot 38 means that can also be used in conjunction with the other aforesaid flaps 21 and 27 if desirable. This wing pitch-pivot 38 can function in using the same operating components as used by the two aforesaid flaps 21 and 27, such as the same hydraulic motor unit 45, but with its own hydraulic cylinder, linkage and lines (not shown) to function in pitching the extended airfoils 13 around its pitch-pivot axis 38 at the slip separation 37, between the two reinforced ribs 31. This same pitch means is known to the art, and will also function to equalize the lift forces of the gyro type aircraft only in the downwind quadrant, automatically.

The special dual purpose flap 27 contains a safety feature that can be used for power-off horizontal flight in which the dual purpose flap 27 is used as the means for the auto-rotation of the rotary frame 12 and extended airfoil 13 assembly. With the drive-shaft 58 and drive gear 54 in FIGS. 3 and 4 which are held in alignment by a drive shaft support 55 and are disengaged by means (not shown) for power-off horizontal flight. When the dual purpose flap 27 drops down into the slip-stream in the downwind quadrant only, it will cause air pressure to push against the back surface 27A of the dual purpose flap 27; causing the complete rotary frame 12 and extending airfoils 13 assembly to continue its spin as long as the aircraft 10 is moving forward in flight. The back surface 27A of the dual purpose flap 27 has a reinforcing bar 39 for added strength and attaching of the hydraulic cylinder and linkage 30 assembly.

Figure 7:
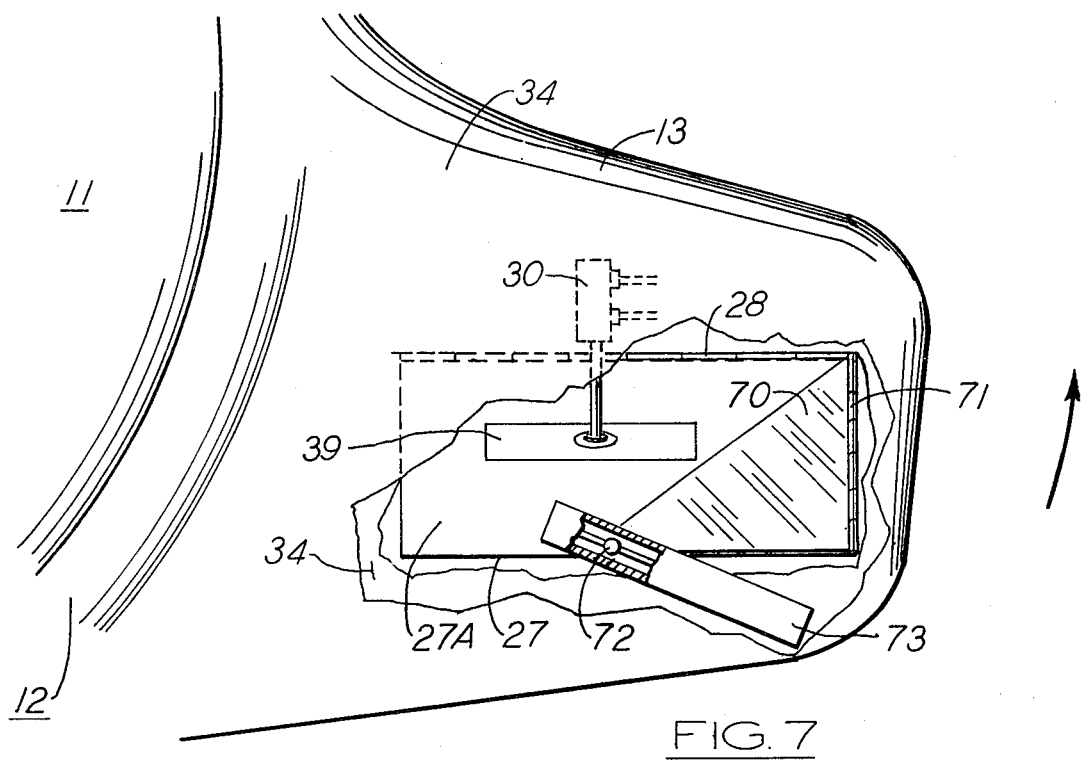
FIG. 7 is a top plan view of an extended airfoil in the upwind quadrant, with a cut away surface showing a dual purpose flap and a trap flap in a closed position.
Figure 8:
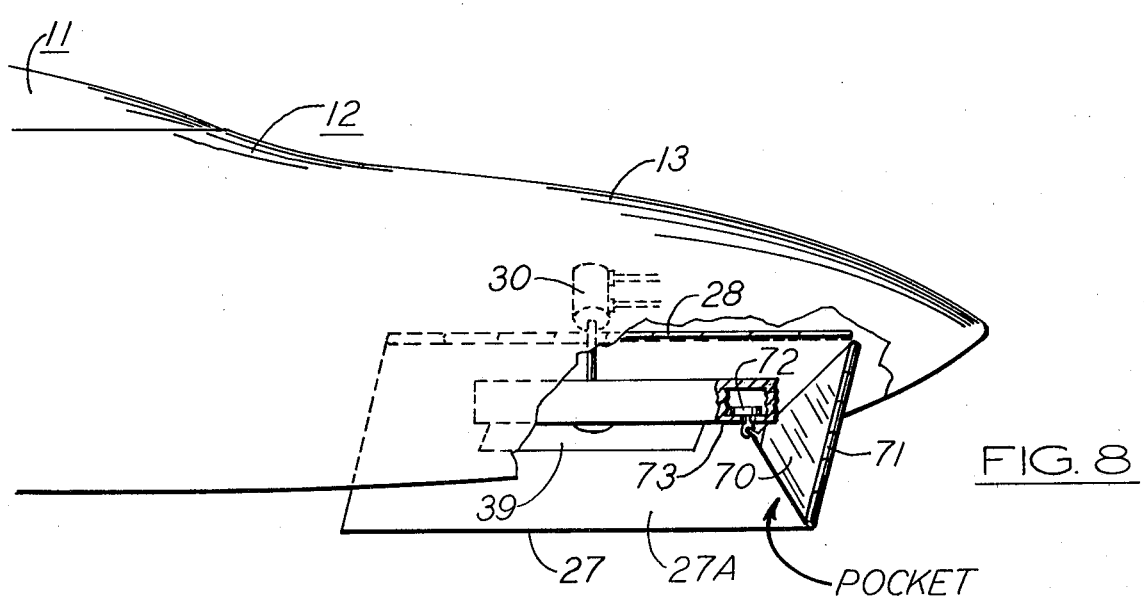
FIG. 8 is a rear elevation view of an extended airfoil in the downwind quadrat, with part of the skin surface removed to show the dual purpose flap and trap flap in the open or extended position, and forming a pocket.

Referring to FIGS. 7 and 8 there is shown a triangular shaped trap flap 70 assembly which functions in aiding the dual purpose flap 27 when it is open and extended. The trap flap 70 is connected to the outboard edge of the dual purpose flap 27 and pivots open and closed by action of the dual purpose flap 27 when it opens and closes. The trap flap 70 is attached at one end by a pivot means 71 along the outboard edge of the dual purpose flap 27, with its opposite end connected to the bottom surface of the extended airfoils 13 via T-linkage and swivel means that slides inside a T-slot track 73. When the dual purpose flap 27 opens by moving downward into the slip-stream, it also moves the outboard edge of the trap flap 70 downward and forcing its opposite T-linkage and swivel 72 end, to slide towards the outboard side in its T-track 73 and forcing the trap flap 70 to open up to an almost 90 degree vertical position. The trap flap 70 when in the open or extended position forms a pocket at the outboard edge of the dual purpose flap 27 and its back surface 27A and the bottom surface of the extended airfoils 13. Without the trap flap 70 installed, the air pressure from the slip-stream will slide out and off of the dual purpose flap 27 and its back surface 27A almost instantly along the outboard open end, with every slight degree of rotation made by the rotary frame 12 and extended airfoil 13 assembly. But with the trap flap 70 attached and in operation then in the down-wind quadrant, causes the slip-stream to build up air pressure for a longer period (i.e. through more degrees of rotation) thus giving the rotary frame 12 and extended airfoil 13 assembly a more positive rotational force means, when the rotary frame 12 and extended airfoil 13 assembly is put into its auto-rotational mode. The closing operation of the trap flap 70 is actuated by the closing action of the dual purpose flap 27, that forces the T-linkage and swivel 72 to move inboard, because of the outboard end of the T-track 73 is closed and will only permit the trap flap 70 to open to a few degrees less than a full vertical 90 degrees. This slight inboard tilt (less than 90 degrees) of the T-linkage and swivel 72 causes it to slide inboard when closing and not lock up, accidently.

In FIGS. 3 and 4 shows a partial cut away view showing an extended airfoil 13 that contains a solid weighted body 33 in the contoured shape of the airfoil tip, that functions in all of the extended airfoils 13 for storage of energy and gyroscopic stability with a low center of gravity. Attached to the airfoil's solid weighted body 33 are twin spars 32 and mounted to the spars 32 and ribs 31 with metal skin covering 34 that fastens to the ribs 31. The metal skin 34 completely covers the extended airfoils 13 and the rotary frame 12 and the compound multiple curves that makes for a light weight, but very strong rotary frame 12 and extended airfoil 13 assembly that spins around its vertical axis in a horizontal plane, at the periphery of the fuselage 11.

The root ends of the twin spars 32 penetrate through a 360 degree horizontal open slot 43 and attach to an elongated "C" shaped bracket 44 as shown in FIG. 4. Each elongated "C" shaped bradket 44 has two 90 degree angle lips 44A and 44B that engage with two 90 degree angle lips 40A and 41A of the parallel tracks 40 and 41, with contacts between the two pairs of aforesaid lips 44A, 44B and 40A, 41A by multiple bearings 36 that serves to interlock all the said lips together in a free sliding movement, to the parallel tracks 40 and 41 which in turn mounts 360 degrees horizontally at the periphery of the fuselage 11. The slot 43 has an upper slot surface 40B and a lower slot surface 41B in which the spars 32 travel with multiple spar bearing members 32A that make the only contact with the slot surfaces 40B and 41B. On the external side of the parallel tracks 40 and 41 are located multiple bearing members 35A mounted to the spar bearing support 35 that fastened to the spars 32 and these external mounted bearing members 35A coupled with the internal mounting gives the added stability to the extended airfoils 13 as they spin almost frictionless around the horizontal open slot 43 of the mounted parallel tracks 40 and 41 at the periphery of the fuselage 11. Other bearing members 49 that are located throughout the rotary frame 12 and extended airfoil 13 assembly and parallel tracks 40 and 41 are to facilitate the spinning function and support.

On the most inward vertical side 44C of each elongated "C" shaped bracket 44 is mounted a 360 degree horizontal ring flange 46 and ring gear 46A shown in FIG. 4. The ring flange 46 and ring gear 46A locks together, all moving internal components of each extended airfoil 13 and rotary frame 12 into one complete rotating assembly that spins inside and outside of the stationary fuselage 11 and along on the parallel tracks 40 and 41. The ring gear 46A is the means by which the complete rotating assembly is driven by power means with the drive gear 54 turning and meshing with the horizontal 360 degree ring gear 46A and in turn, spinning the entire rotating assembly along the horizontal 360 degree parallel track 40 and 41.

The fuselage 11 has its upper fuselage spars 50A connected to the lower body through vertical fuselage beams 53 to the fuselage floor 51 and floor supports 52 to the lower fuselage spars 50 and with the upper and lower body covered by a metal skin 34A thereby making it one complete stationary fuselage assembly 11.

Figure 9:
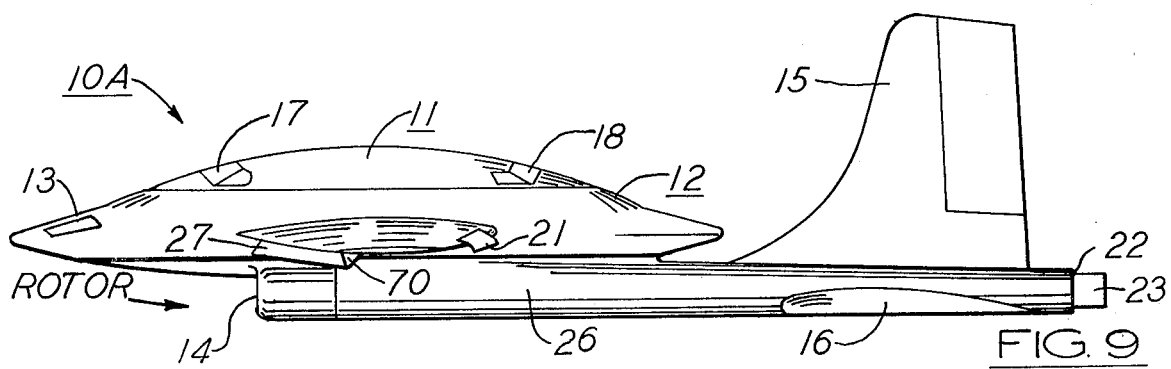
FIG. 9 is a vertical side view showing an alternate mounting of the forward thrust engines and showing the dual purpose flap, trap flap and the Kruger Flap in an open or extended position while in the downwind quadrant.

In FIG. 9 is shown a side view of an alternate in-line gyro type aircraft 10A design with all the aforesaid mentioned components, but with the forward thrust engines 14 in an underslung mounting. Also shown in FIG. 9 is a dual purpose flap 27 and trap flap 70 with both being in an open and extended position, while in the downwind quadrant. Also shown in an open and extended position is a Kruger Flap 21, in the downwind quadrant.

In FIG. 11 is a frontal elevation view of another alternate in-line gyro type aircraft 10B. This design also contains all the aforementioned operating components, but without landing gear and with the bottom fuselage 10 area inside the rotary frame 12 and extended airfoil 13 assembly.

A brief flight procedure of this in-line gyro aircraft would be similar to the following description: As the aircraft sets on the airport ramp, it is noticed that the perfectly balanced rotary frame and extended airfoil assembly is being slowly rotated by a gentle breeze, since it is in a auto-rotating mode. As the pilot prepares for take-off, the pilot engages the rotary frame and extended airfoil assembly with the internal power means and advances the vertical lift throttle until the gyro aircraft slowly lifts vertically with all downwind components operating automatically in their calculated slow rotational speed mode. As the aircraft clears the airport vertically at about 150 feet the pilot advances the vertical lift throttles until they engage the forward thrust throttles as the lift speed increases greatly at the same time the forward thrust is accelerated. The gyro-aircraft then really zooms out and away at approximately 60 degrees vertically with the gyro-aircraft still remaining in a horizontal attitude. The gyro-aircraft with its spinning rotary frame and extended airfoil assembly which is disturbing the solid wall of air ahead of its line of flight, reaches a high altitude at a very fast rate of climb with very little fuel consumption. At approximately 35,000 feet, the pilot cuts back all the way on both power sources and proceeds to maneuver the aircraft by the tail control surfaces that takes a little time, since the gyrodynamic forces are keeping the gyro-aircraft in a normal flat horizontal attitude. The forward thrust momentum keeps the gyro-aircraft in forward flight until the pilot is able to lower the nose into the proper downward shallow flight angle by using the large control surfaces of the tail assembly. With the gyro-aircraft in the proper downward flight angle and the rotary frame and extended airfoil assembly is put into its auto-rotational mode, then the gyro-aircraft is flying on its own in an undulating manner. Thus the force of gravity becomes its source of power means until it reaches its destination with no fuel consumption. Upon reaching its destination the pilot uses the reverse procedure of that used in take-offs and lands at a high angle, using mostly its rotary frame and extended airfoil assembly's power to set the gyro-aircraft down. Since this gyro-aircraft may have no landing gear, it can then use a special wheeled dolly to land on with the aid of the ground crew or it is possible to use any suitable body of water as a landing site.

The gyro-aircraft is highly suitable for mass production for many of its components, such as segments of the rotary frame and airfoils. Sections of the rotary frame and extended airfoil assembly can be stamped out, which would be ideal in producing the many identical compound curves that maintain aerodynamics, strength and rigidity. The identical parallel tracks can be cast into segments and bolted or welded together to form its 360 degree upper and lower parallel tracks and then placing them on a grinding jig to finish the race surface etc. as one unit, to exactness and balance. These mass produced units would be ideal for the do-it-yourselfers, who would be relieved of the many hours of labor and less worries about safety in construction and airworthiness. Outward model changes would almost be nil, since aircraft are unlike automobiles that make outward costly style changes each year, whereas aircraft people are interested primarily in functional and safety improvement changes.

What is claimed is:

1. A fuselage body adapted for powered flight and sustained power-off flight with auto-rotation means, said fuselage body having the general shape of an aerodynamic inverted saucer, in which a continuous circular track is mounted at the periphery of said fuselage body, and mounted to and riding on bearings in said continuous circular track is a circular rotary frame;

said circular rotary frame including an extended airfoil assembly containing multiple airfoils extending from spaced locations around the periphery of said circular frame and radially therefrom, so as to engage the air and develope lifting forces as said extending airfoils rotate about said fuselage body;

said multiple airfoils contain solid weighted bodies within their extreme tips, said solid weighted bodies conforming to the shape of the airfoil tips, and having a density and balance that will produce inertial properties when spinning, to thus create a positive gyroscopic force with stored energy as in a segmented type of gyroscope;

first power means mounted inside the fuselage body and connected to said circular rotary frame and extended airfoil assembly for moving said frame and airfoil assembly along said circular track to create a lift force on said rotating multiple extending airfoils, and said first power means also containing means for the auto-rotation of said rotary frame and extended airfoil assembly;

second power means mounted on the fuselage body in twin booms that extended rearwardly from said fuselage body to provide forward thrust for horizontal flight, and attached to the tail exhaust of said twin booms are torque control vanes, also attached to the tail area of said twin booms beyond the outer circumference of the extending airfoil tips are a tail assembly and control surfaces for said fuselage body;

other control surface means are located on said extending airfoils, said other control surface means including dual purpose flaps which function by means in the downwind quadrant for additional lift forces, and attached to said dual purpose flaps on an outboard edge thereof are trap flaps, one end of each said trap flap being attached to its respective extending airfoil by a slide means and the other end being attached to said outboard edge of said dual purpose flap by a hinge means, that allows both the dual purpose flap and trap flap to open together and close automatically as a unit for trapping the slip-stream pressure, when open in the downwind quadrant, on and between a back surface of the dual purpose flap and a surface of the airfoils at right angle to the direction of flight of the fuselage body, to thus become the power means for auto-rotation of the circular rotary frame and multiple extended airfoils in poweroff flight; and aerodynamic flap means in the form of a leading edge airfoil type flap mounted on the leading edge of each said extending airfoil by means which can extend said flap forward from the leading edge of said extending airfoil into the slip-stream to develope additional lift only as the extending airfoils pass into the downwind quadrant of said fuselage body.

2. The body of claim 1 in which,
the extending airfoils taper towards their tips, and terminate to a knife sharp tip edge for penetrating of air resistance.

3. The body of claim 1 including,
said rotary frame with the extending airfoils having a pitch means, that when pitched to a desired angle of attack, will create equalizing lift force in the downwind quadrant.

4. The body of claim 1 including,
a skin that covers the bottom of the rotary frame and extending airfoils, and also covers and encloses the fuselage inside of it, thus forming a supporting cradle for the fuselage, that produces a better lift surface and a sealed bottom for water landings.

5. The body of claim 1 in which,
said extending airfoils have the design of zero degrees of incidence.

6. The body of claim 1 in which,
the weighted bodies in the airfoil tips are located in such a manner, as to produce an extreme low center of gravity, such as in airfoils having a negative degree of dihedral.

* * * * *